United States Patent
Ito et al.

(10) Patent No.: US 8,339,554 B2
(45) Date of Patent: Dec. 25, 2012

(54) LIQUID CRYSTAL DEVICE AND ELECTRONIC APPARATUS HAVING THE SAME

(75) Inventors: Atsushi Ito, Nagano (JP); Shin Fujita, Nagano (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 13/006,647

(22) Filed: Jan. 14, 2011

(65) Prior Publication Data

US 2011/0109859 A1 May 12, 2011

Related U.S. Application Data

(62) Division of application No. 12/206,038, filed on Sep. 8, 2008, now Pat. No. 7,990,505.

(30) Foreign Application Priority Data

Oct. 24, 2007  (JP) .................................. 2007-276058

(51) Int. Cl.
*G02F 1/1343* (2006.01)
(52) U.S. Cl. ...................... 349/139; 349/145; 349/141
(58) Field of Classification Search .................. 349/139, 349/141, 145
See application file for complete search history.

(56) References Cited

U.S. PATENT DOCUMENTS

| | | | | |
|---|---|---|---|---|
| 6,404,474 B1 * | 6/2002 | Watanabe et al. | ............ | 349/141 |
| 6,498,634 B1 * | 12/2002 | Yamazaki et al. | ............ | 349/141 |
| 6,897,930 B2 * | 5/2005 | Nakayoshi et al. | ............ | 349/139 |
| 6,914,655 B2 * | 7/2005 | Yamazaki et al. | ............ | 349/141 |
| 7,242,448 B2 * | 7/2007 | Okumura | .............. | 349/114 |
| 7,307,681 B2 * | 12/2007 | Okumura | .............. | 349/114 |
| 7,327,412 B2 * | 2/2008 | Yamazaki et al. | ............. | 349/43 |
| 7,388,640 B2 * | 6/2008 | Lee et al. | .............. | 349/141 |
| 7,388,653 B2 * | 6/2008 | Kim | ..................... | 355/77 |
| 2003/0123012 A1 * | 7/2003 | Yanagawa et al. | ............. | 349/141 |
| 2003/0137615 A1 * | 7/2003 | Nakayoshi et al. | ............. | 349/43 |
| 2004/0174485 A1 * | 9/2004 | Yamazaki et al. | ............. | 349/141 |
| 2004/0196417 A1 * | 10/2004 | Okazaki et al. | ............... | 349/111 |
| 2004/0233367 A1 * | 11/2004 | Kim et al. | ..................... | 349/139 |
| 2006/0274242 A1 * | 12/2006 | Okumura | ..................... | 349/114 |
| 2007/0019149 A1 * | 1/2007 | Kudo et al. | .................... | 349/155 |
| 2007/0279542 A1 * | 12/2007 | Kim et al. | ...................... | 349/38 |
| 2007/0296895 A1 * | 12/2007 | Okumura | ..................... | 349/114 |
| 2008/0007666 A1 * | 1/2008 | Takeda et al. | .................. | 349/43 |
| 2008/0063787 A1 * | 3/2008 | Hong | ............................. | 427/58 |
| 2008/0151157 A1 * | 6/2008 | Okumura | ..................... | 349/114 |

FOREIGN PATENT DOCUMENTS

| | | |
|---|---|---|
| JP | 2002-182230 | 6/2002 |
| JP | 2005-122178 | 5/2005 |
| JP | 2005-173536 | 6/2005 |

OTHER PUBLICATIONS

Japanese Patent Office, Notice of reasons for refusal, issued in connection with Japanese Patent Application Serial No. 2007-276058, dated May 8, 2012. (5 pages).

* cited by examiner

*Primary Examiner* — K. Cyrus Kianni
(74) *Attorney, Agent, or Firm* — K&L Gates LLP (57) ABSTRACT

A liquid crystal device includes a first substrate; a second substrate arranged to face the first substrate; a liquid crystal layer disposed between the first substrate and the second substrate, a pixel electrode disposed over the substrate; and a common electrode overlapping the pixel electrode, and the common electrode having curved portions between slits in the common electrode.

1 Claim, 11 Drawing Sheets

RUBBING DIRECTION

LIQUID CRYSTAL DEVICE AND ELECTRONIC APPARATUS HAVING THE SAME

CROSS REFERENCE TO RELATED APPLICATIONS

The present application is a divisional that claims priority to U.S. patent application Ser. No. 12/206,038 filed on Sep. 8, 2008, which claims priority to Japanese Patent Application JP 2007-276058 filed in the Japanese Patent Office on Oct. 24, 2007, the entire contents of which being incorporated herein by reference.

BACKGROUND

1. Technical Field

The present invention relates to a liquid crystal device and an electronic apparatus having the liquid crystal device.

2. Related Art

Fringe-field switching (FFS) mode liquid crystal displays (LCDs) have been developed to compensate for low aperture ratio and low transmissivity of in-plane switching (IPS) mode LCDs.

Figure 11:
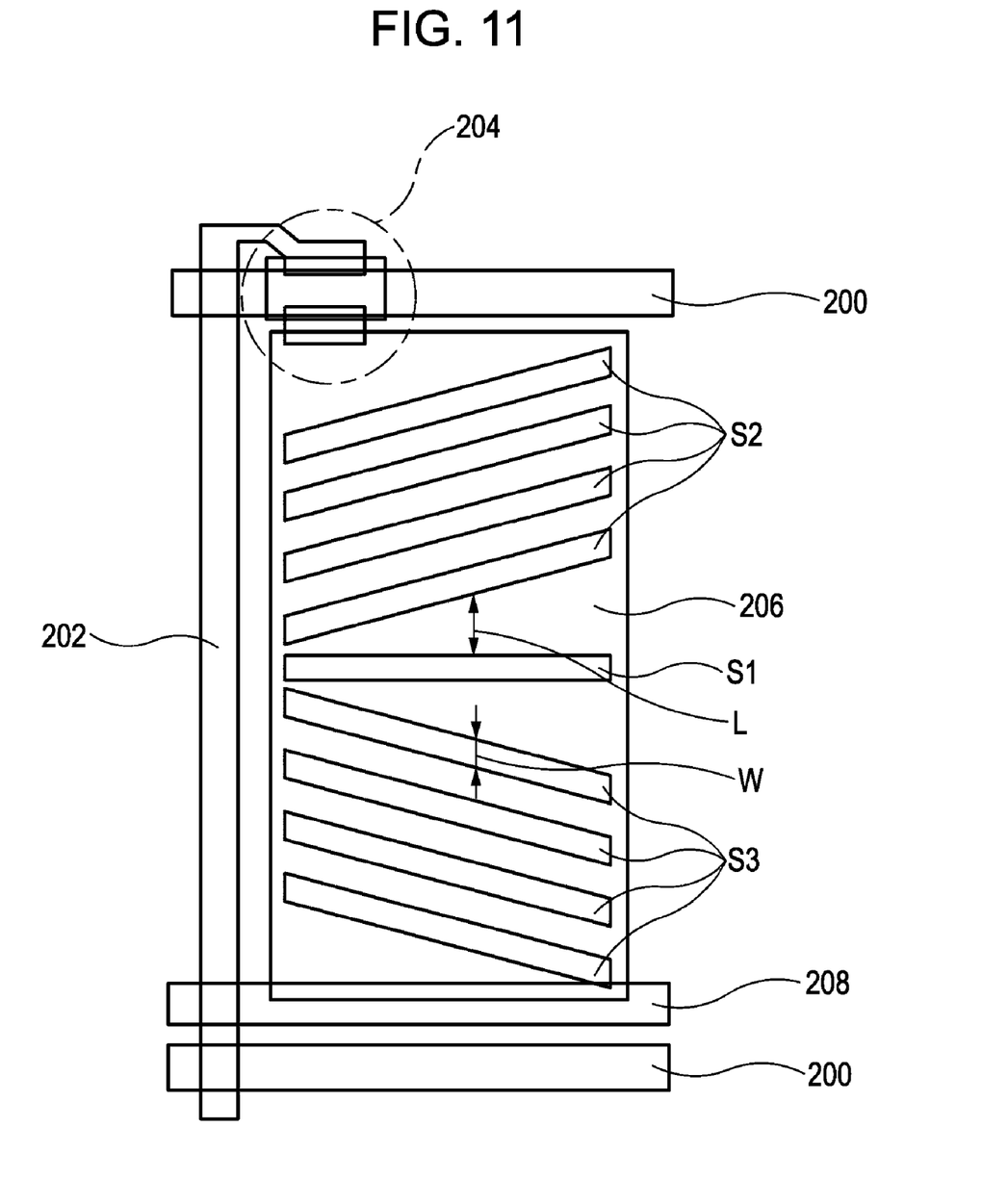
FIG. 11 is a plan view of a pixel of a known liquid crystal device.

FIG. 11 is a plan view of a known FFS mode LCD. As shown in FIG. 11, a plurality of gate lines 200 and data lines 202 are arranged on a first transparent insulating substrate (not shown) in such a manner that they intersect each other and define unit pixels. Thin film transistors 204 are provided at the intersections of the gate lines 200 and the data lines 202. Plate-shaped common electrodes (not shown) are provided in the pixel regions defined by the gate lines 200 and data lines 202 arranged to intersect each other.

Pixel electrodes 206 are provided in the pixel regions. The pixel electrodes 206 are electrically insulated from the common electrodes and in contact with the thin film transistors 204. Each pixel electrode 206 has a plurality of slits, namely, a reference slit S1 that extends parallel to the gate lines 200 and is provided in the middle of the pixel in the longitudinal direction, a plurality of upper slits S2 arranged at a predetermined angle with respect to the reference slit S1, and a plurality of lower slits S3 arranged at a predetermined angle with respect to the reference slit S1.

Common signal lines 208 for applying common signals to the common electrodes are provided at edges of the pixels, adjacent to and parallel to the gate lines 200. The common signal lines 208 are partially in contact with the common electrodes, and partially overlap the pixel electrodes 206.

A color filter substrate (not shown) is arranged at a predetermined distance from the above-described array substrate. The color filter substrate includes a second transparent insulating substrate and predetermined elements, including a black matrix and color filters, formed thereon. A liquid crystal layer (not shown) containing positive or negative liquid crystal molecules is disposed between the first and second transparent insulating substrates.

A first horizontal alignment film and a second horizontal alignment film are provided on the inner surfaces of the array substrate and the color filter substrate, respectively. A first polarizing plate and a second polarizing plate are provided on the outer surfaces of the array substrate and the color filter substrate, respectively.

The first and second horizontal alignment films are rubbed in the direction parallel to the gate lines 200 when a positive liquid crystal is used, and in the direction parallel to the data lines 202 when a negative liquid crystal is used. The first and second polarizing plates are disposed in such a manner that their transmission axes are perpendicular to each other, to allow the LCD to operate in a normally black mode. One of the first and second polarizing plates is disposed in such a manner that its transmission axis is parallel to the rubbing axis of the alignment film.

In the above-described FFS mode LCD, the distance between the array substrate and the color filter substrate is larger than the distance between the common electrodes and the pixel electrodes 206. Thus, when an electric field is generated between the common electrodes and the pixel electrodes 206, a fringe field is generated between and above the two electrodes. Because the fringe field is generated over the entire region including a region above the common electrodes and the pixel electrodes 206, when the device is driven, not only the liquid crystal molecules between the common electrodes and the pixel electrodes 206, but also the liquid crystal molecules positioned above the two electrodes are operated.

In the FFS mode LCD, both the common electrode and the pixel electrode are made of a transparent conductive film. Thus, the FFS mode LCD has a high aperture ratio. Further, because the liquid crystal molecules above the electrodes are operated, the FFS mode LCD has high transmissivity. Further, symmetrical electric fields are formed in one pixel region or adjoining pixel regions, the refractive index anisotropy of liquid crystal molecules is corrected. Thus, color misalignment is prevented from occurring (for example, refer to JP-A-2002-182230).

As described above, the FFS mode LCD has the advantages that it has a high aperture ratio and high transmissivity. Further, it prevents color misalignment from occurring. However, the FFS mode LCD has the following disadvantages. When the rubbing axis is inclined 30 degrees or 45 degrees, the edge portions of the slits S2 and S3 in the pixel electrodes 206 become acute. This makes the electric fields in the slits be oriented in a plurality of directions, when a fringe field is generated between the common electrodes and the pixel electrodes 206. This causes some liquid crystal molecules to be oriented in directions slightly different from the direction in which the other liquid crystal molecules are oriented. Display defects, called disclinations, are produced at the boundary regions between these liquid crystal molecules oriented in directions slightly different from the direction in which the other liquid crystal molecules are oriented. When the display defects are produced in the display region, the transmissivity is decreased.

The FFS mode LCD has the slits S1, S2, and S3 in each pixel electrode 206. In this structure, the width W of the slits is narrow, or the distance L between the slits is large. At a portion where the width of the electrode is large, for example, the transmissivity tends to decrease, as in the case of IPS mode LCDs. Accordingly, it is difficult to produce LCD panels having good characteristics. In addition, there are some points where the movements of the liquid crystal molecules are different. In these regions, the transmissivity decreases.

SUMMARY

An advantage of some aspects of the invention is that it provides a liquid crystal device including: a first substrate; a second substrate arranged to face the first substrate; a liquid crystal layer disposed between the first substrate and the second substrate; a pixel electrode disposed over the substrate; and a common electrode overlapping the pixel electrode, and the common electrode having curved portions between slits in the common electrode. The common electrodes each have bent portions. The bent portions each have a curved portion that restricts generation of disclination of the orientation of liquid crystal molecules due to existence of discontinuous portions.

In this configuration, the common electrodes do not have any sharply angled portion but have continuously (gently) angled portions. Thus, occurrence of disclination is minimized. It is possible to provide a liquid crystal device having good view angle characteristics without sacrificing the transmissivity.

Another advantage of some aspects of the invention is that it provides a liquid crystal device comprising: a first substrate; a second substrate arranged to face the first substrate; a liquid crystal layer disposed between the first substrate and the second substrate; a common electrode disposed over the substrate; and a pixel electrode overlapping the common electrode, and the pixel electrode having curved portions between slits in the pixel electrode. Each of the pixel electrodes has a plurality of bent portions. The bent portions each have a curved portion that restricts generation of disclination of the orientation of liquid crystal molecules due to existence of discontinuous portions.

In this configuration, the common electrodes do not have any sharply angled portion but have continuously (gently) angled portions. Thus, occurrence of disclination is minimized. It is possible to provide a liquid crystal device having good view angle characteristics without sacrificing the transmissivity.

The common electrodes may be comb-shaped, and the bent portions may be circular-arc-shaped.

In this configuration, during application of voltage, the liquid crystal molecules are orientated in various directions (directions normal to the circular-arc) according to various electric fields. Thus, the side faces of the liquid crystal molecules can be seen from any angle, which increases the view angle. Because there is no region where liquid crystal inversion obviously occurs, the view angle characteristics are improved.

The pixel electrodes may be comb-shaped, and the bent portions may be circular-arc-shaped.

In this configuration, during application of voltage, the liquid crystal molecules are orientated in various directions (directions normal to the circular-arc) according to various electric fields. Thus, the side faces of the liquid crystal molecules can be seen from any angle, which increases the view angle. Because there is no region where liquid crystal inversion obviously occurs, the view angle characteristics are improved.

A first horizontal alignment film and a second horizontal alignment film, which are rubbed in a top-bottom direction or a left-right direction of a liquid crystal panel, may be formed on inner surfaces of the first substrate and the second substrate, respectively. Chords of the circular-arc shapes of the bent portions may be parallel to the axis in the rubbing direction.

In this configuration, during black display, the liquid crystal molecules are aligned in the rubbing direction and exhibit an OFF display.

The circular-arc shapes of the bent portions may be concentric.

In this configuration, during application of voltage, the liquid crystal molecules are orientated in various directions (directions normal to the circular-arc) according to various electric fields. Thus, the side faces of the liquid crystal molecules can be seen from any angle, which increases the view angle. Because there is no region where liquid crystal inversion obviously occurs, the view angle characteristics are improved.

The circular-arc shapes of the bent portions may be arranged symmetrically with respect to a long side of a pixel.

In this configuration, during application of voltage, the liquid crystal molecules are orientated in various directions (directions normal to the circular-arc) according to various electric fields. Thus, the side faces of the liquid crystal molecules can be seen from any angle, which increases the view angle. Because there is no region where liquid crystal inversion obviously occurs, the view angle characteristics are improved.

The circular-arc shapes of the bent portions may be arranged symmetrically with respect to a short side of a pixel.

In this configuration, during application of voltage, the liquid crystal molecules are orientated in various directions (directions normal to the circular-arc) according to various electric fields. Thus, the side faces of the liquid crystal molecules can be seen from any angle, which increases the view angle. Because there is no region where liquid crystal inversion obviously occurs, the view angle characteristics are improved.

The circular-arc shapes of the bent portions may be arranged symmetrically with respect to the center of gravity of a pixel.

In this configuration, during application of voltage, the liquid crystal molecules are orientated in various directions (directions normal to the circular-arc) according to various electric fields. Thus, the side faces of the liquid crystal molecules can be seen from any angle, which increases the view angle. Because there is no region where liquid crystal inversion obviously occurs, the view angle characteristics are improved.

The second substrate may have a light-blocking film disposed in a region facing longitudinal and transverse boundary regions between the pixel electrodes. The light-blocking film and either the pixel electrodes or the common electrodes may at least partially overlap each other.

In this configuration, generation of disclination is minimized, and the pixel regions are utilized more effectively than before. Accordingly, the brightness of the liquid crystal panel is improved.

The pixel electrode and the common electrode may be made of a transparent conductive film.

In this configuration, the pixel regions are utilized more effectively than before. Accordingly, the brightness of the liquid crystal panel is improved.

Another advantage of some aspects of the invention is that it provides an electronic apparatus having the above-described liquid crystal device.

In this configuration, an electronic apparatus having good transmissivity, in which generation of disclination is controlled, is provided.

BRIEF DESCRIPTION OF THE DRAWINGS

The invention will be described with reference to the accompanying drawings, wherein like numbers reference like elements.

DESCRIPTION OF EXEMPLARY EMBODIMENTS

The present embodiment will now be described with reference to the drawings. For the sake of visibility, in the drawings, layers and components are illustrated in various scales. Color filters and alignment films are not shown.

Overall Structure

Figure 1A:
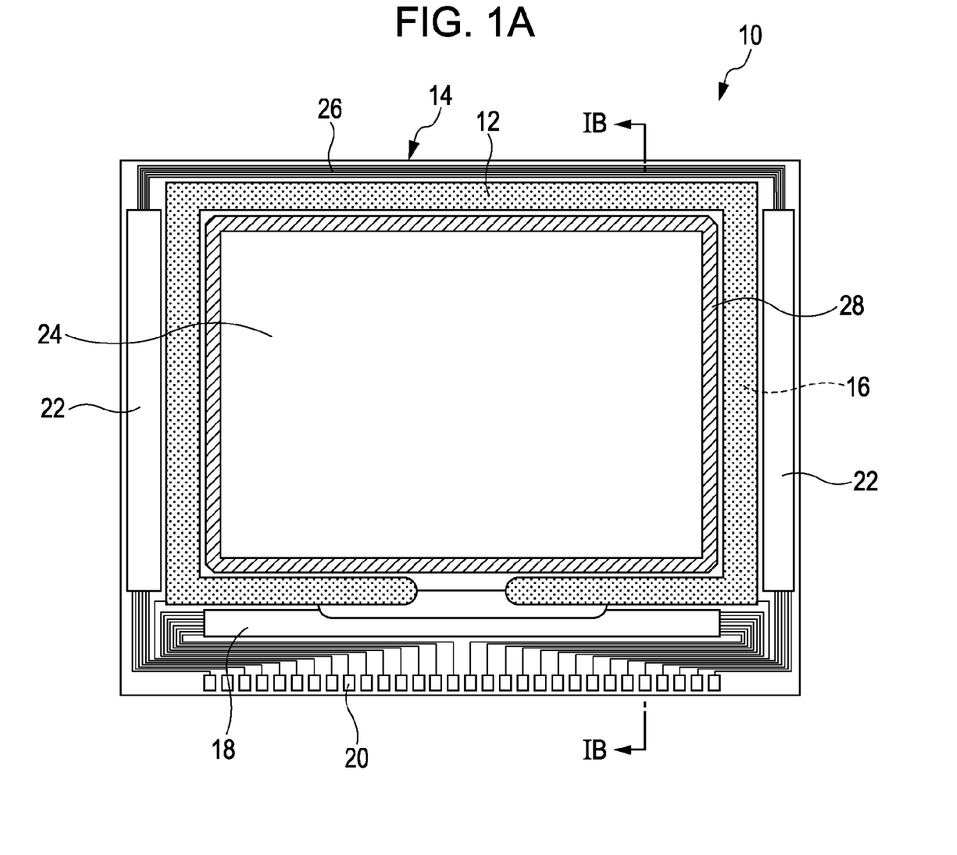
FIG. 1A is a plan view of a liquid crystal device according to the present embodiment and components formed thereon, viewed from a counter substrate.
Figure 1B:
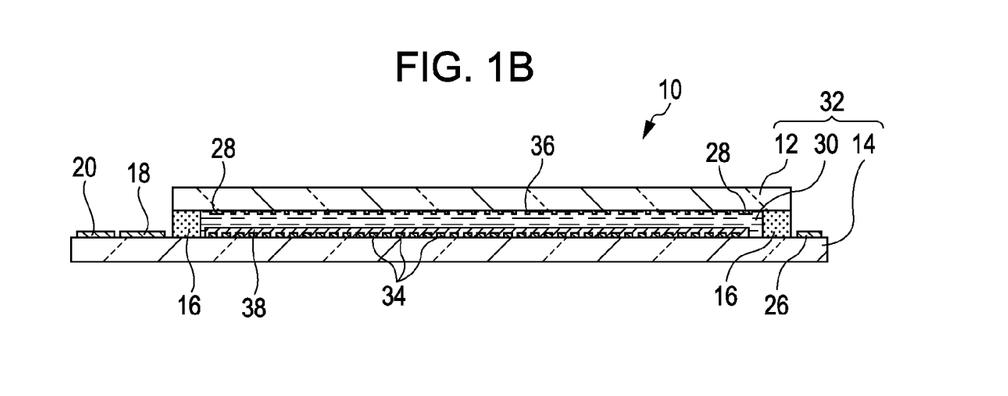
FIG. 1B is a sectional view of the same, taken along line IB-IB in FIG. 1A.

FIG. 1A is a plan view of a liquid crystal device 10 according to the present embodiment and components formed thereon, viewed from a counter substrate 12, and FIG. 1B is a sectional view of the same, taken along line IB-IB in FIG. 1A. More specifically, FIG. 1A is a plan view of the liquid crystal device 10 viewed in a direction normal to the counter substrate 12.

In FIGS. 1A and 1B, the liquid crystal device 10 according to the present embodiment is a transmissive active-matrix liquid crystal device. The liquid crystal device 10 includes an element substrate (first substrate) 14 and a counter substrate (second substrate) 12. A seal portion 16 is provided between the element substrate 14 and the counter substrate 12, along the edges of the counter substrate 12. A data-line driving circuit 18 and mounted terminals 20 are provided along an edge of the element substrate 14, in the region outside the seal portion 16. Gate-line driving circuits 22 are provided on the element substrate 14, along the two edges adjoining the edge provided with the mounted terminals 20. A plurality of lines 26 connecting the gate-line driving circuits 22, which are provided along both side edges of an image display area 24, is provided along the remaining edge of the element substrate 14. A peripheral circuit such as a precharge circuit and an inspection circuit may be provided beneath a frame 28. The outlines of the counter substrate 12 and the seal portion 16 are substantially the same. The seal portion 16 serves to fix the counter substrate 12 and the element substrate 14 together. A liquid crystal layer 30 is disposed between the element substrate 14 and the counter substrate 12. The element substrate 14, the counter substrate 12, and the liquid crystal layer 30 constitute a liquid crystal panel 32.

Although a detailed description will be given below, the element substrate 14 is provided with pixel electrodes 34 arranged in a matrix form. The frame 28 made of a light-blocking material is provided on the counter substrate 12, in the region inside the seal portion 16. The area surrounded by the frame 28 is the image display area 24. The counter substrate 12 may be provided with a light-blocking film 36 referred to as a black matrix, a black stripe, or the like, in a region facing the longitudinal and transverse boundary regions between the pixel electrodes 34 on the element substrate 14.

The liquid crystal device 10 according to the present embodiment drives the liquid crystal layer 30 in an FFS mode. Thus, common electrodes 38 and the pixel electrodes 34 are formed on the element substrate 14. The counter substrate 12 does not have a counter electrode.

Detailed Structure of Liquid Crystal Device 10

Figure 2:
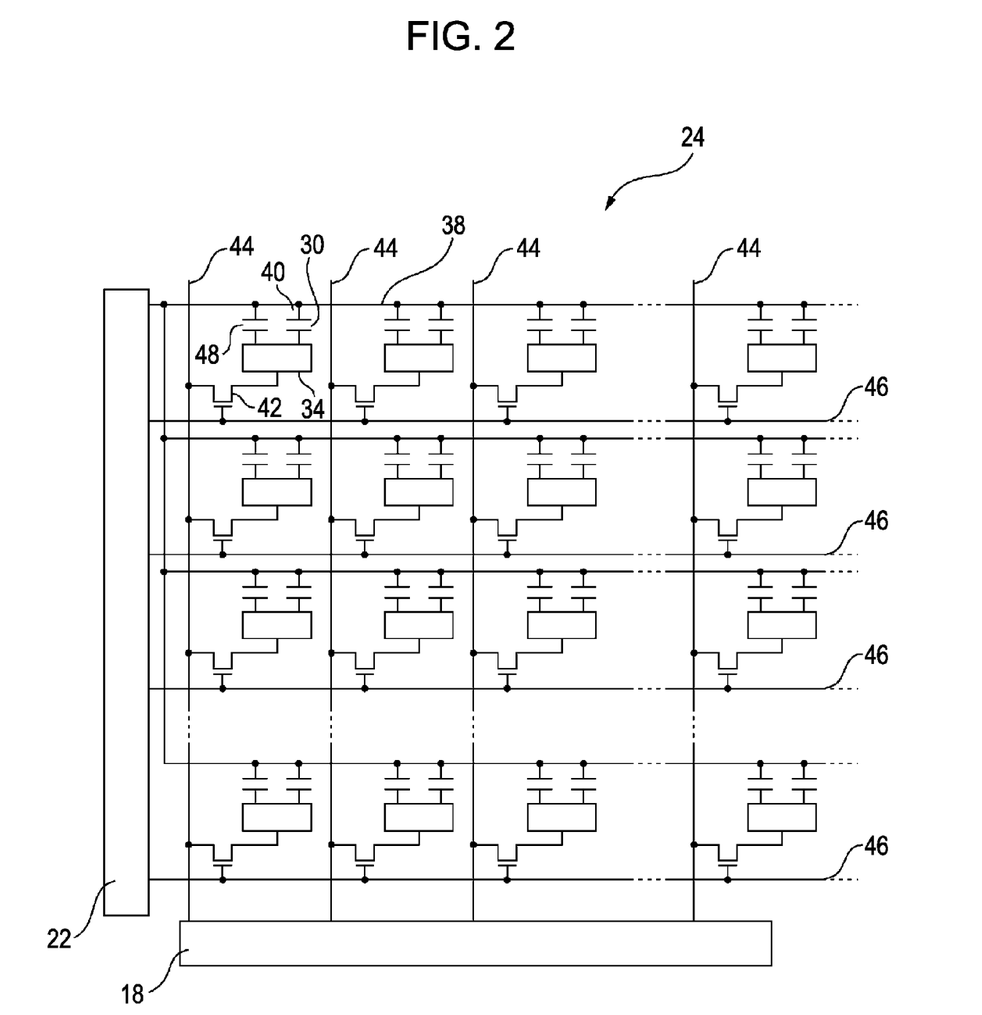
FIG. 2 is an equivalent circuit diagram showing an electrical structure of an image display area of an element substrate used in the liquid crystal device according to the present embodiment.

Referring to FIG. 2, the structures of the liquid crystal device 10 according to the present embodiment and the element substrate 14 used therein will be described. FIG. 2 is an equivalent circuit diagram showing an electrical structure of the image display area 24 of the element substrate 14 used in the liquid crystal device 10 according to the present embodiment.

As shown in FIG. 2, a plurality of rectangular pixels 40 are arranged in a matrix form in the image display area 24. Each pixel 40 has the pixel electrode 34 and a thin film transistor 42 for switching the pixel to control the pixel electrode 34. Data lines 44 that supply data signals (image signals) in a line-sequential manner are electrically connected to the source electrodes of the thin film transistors 42. Gate lines 46 are electrically connected to the gate electrodes of the thin film transistors 42. Scanning signals are supplied to the gate lines 46 in a line-sequential manner, at a predetermined timing. The pixel electrodes 34 are electrically connected to the drain electrodes of the thin film transistors 42. By setting the thin film transistors 42 to an ON state for a certain duration, the data signals supplied from the data lines 44 are written in the pixels 40 at a predetermined timing. The pixel signals at a predetermined level, written in the liquid crystal layer 30 shown in FIG. 1B through the pixel electrodes 34, are stored for a certain duration between the pixel electrodes 34 and the common electrodes 38 formed on the element substrate 14. Since capacitors 48 are formed between the common electrodes 38 and the pixel electrodes 34, voltages of the pixel electrodes 34 are stored for a duration that is one to ten thousand times the duration of application of the source voltage. Thus charge-storage characteristics are improved, whereby the liquid crystal device 10 becomes capable of displaying high contrast images.

Although the common electrodes 38 are illustrated as wires extending between the gate-line driving circuits 22 in FIG. 2, the common electrodes 38 are formed over substantially the entirety of the image display area 24 of the element substrate 14, and is maintained at a predetermined electric potential.

Detailed Structure of Pixel 40

Figure 3A:
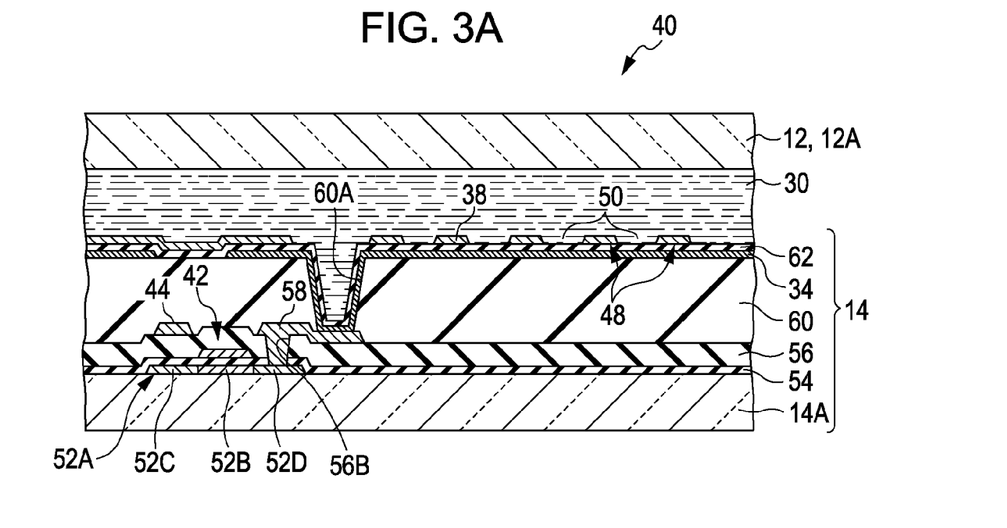
FIG. 3A is a sectional view of one of pixels of the liquid crystal device according to the present embodiment, taken along line IIIA-IIIA in FIG. 3B.
Figure 3B:
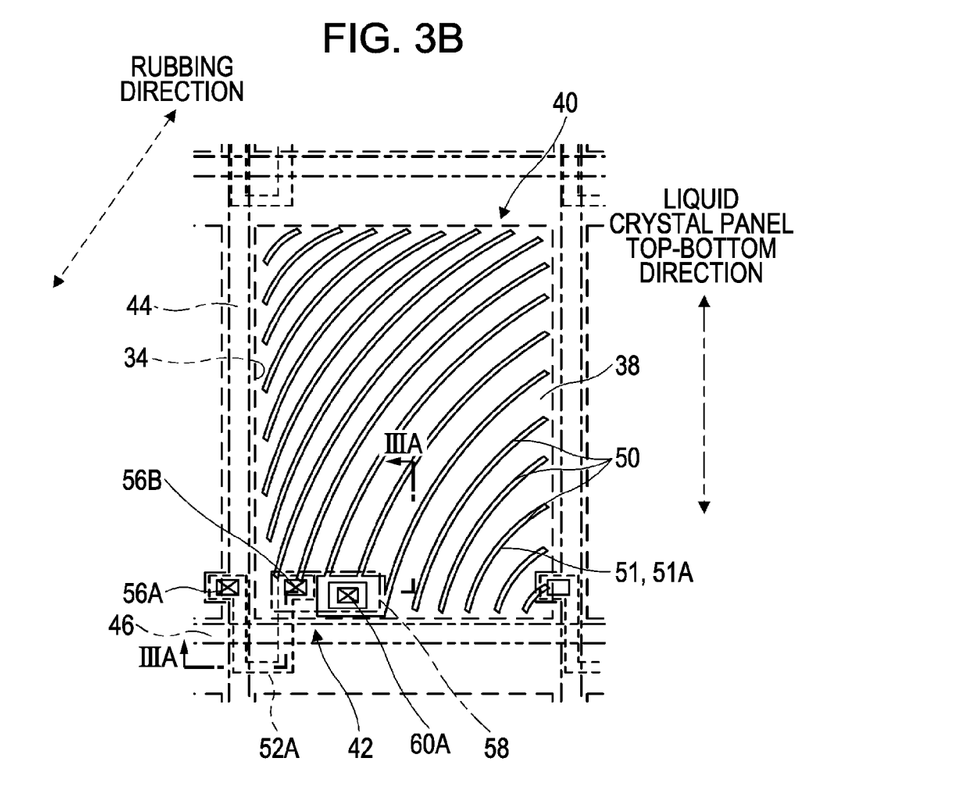
FIG. 3B is a plan view of the pixels adjoining each other on the element substrate.

FIG. 3A is a sectional view of one of the pixels 40 of the liquid crystal device 10 according to the present embodiment, taken along line IIIA-IIIA in FIG. 3B, and FIG. 3B is a plan view of the pixels 40 adjoining each other on the element substrate 14. In FIG. 3B, the pixel electrodes 34 are indicated by the dashed line, the data lines 44 and thin films formed simultaneously therewith are indicated by the alternate long and short dash line, the gate lines 46 are indicated by the alternate long and two short dashes line, and partially removed portions in the common electrodes 38 are indicated by the solid line.

As shown in FIGS. 3A and 3B, the pixels 40, each including a transparent pixel electrode (the region defined by the dashed line), namely, the pixel electrode 34, are arranged in a matrix form on the element substrate 14. The data lines 44 and the gate lines 46 are provided along the longitudinal and transverse boundary regions between the pixel electrodes 34. The pixels 40 are arranged in such a manner that the long sides of the pixels 40 extend in the top-bottom direction of the liquid crystal panel 32, in the plan view.

The common electrodes 38 made of a transparent conductive film or the like (for example, indium tin oxide (ITO) film) is formed on substantially the entirety of the image display area 24 (refer to FIG. 1A) of the element substrate 14. The common electrodes 38 each have a plurality of circular-arc-shaped slit-like openings 50 (indicated by the solid line), the chords of which are parallel to the axis in the rubbing direction.

In the present embodiment, the common electrodes 38 are slit-like electrodes. The common electrodes 38 each have bent portions 51. The bent portions 51 each have a curved portion 51A. The bent portions 51 are circular-arc-shaped. First and second horizontal alignment films (not shown) are formed on the inner surfaces of the element substrate 14 and the counter substrate 12, respectively. The first and second horizontal alignment films have been rubbed in the top-bottom direction or in the left-right direction of the liquid crystal panel 32. The chords of the circular-arc shapes of the bent portions 51 are parallel to the axis in the rubbing direction. The circular-arc shapes of the bent portions 51 are concentric. The circular-arc shapes of the bent portions 51 may be symmetrical with respect to the long sides of the pixels 40. The circular-arc shapes of the bent portions 51 may alternatively be symmetrical with respect to the short sides of the pixels 40. The circular-arc shapes of the bent portions 51 may alternatively be symmetrical with respect to the center of gravity of each pixel 40. In the above-described configurations, the common electrodes 38 do not have any sharply angled portion but have continuously (gently) angled portions. Thus, occurrence of disclination of the orientation of the liquid crystal molecules due to existence of discontinuous portions is suppressed. During application of voltage, the liquid crystal molecules are oriented in various directions (directions normal to the circular-arc) according to various electric fields. Thus, the side faces of the liquid crystal molecules can be seen from any angle, which increases the view angle. Because there is no region where liquid crystal inversion obviously occurs, the view angle characteristics are improved.

The common electrodes 38 and the light-blocking films 36 at least partially overlap each other. This prevents disclinations from entering the image display area 24. The openings 50 may be provided in the pixel electrodes 34, instead of the common electrodes 38.

The gate lines 46 and the data lines 44 are arranged to intersect each other in the image display area 24. The pixels 40 are provided in the rectangular regions defined by the gate lines 46 and the data lines 44. Each pixel 40 has the pixel electrode 34.

Referring to FIG. 3A, the base of the element substrate 14 is a transparent insulating substrate 14A such as a quartz substrate or a heat-resistant glass substrate, and the base of the counter substrate 12 is a transparent insulating substrate 12A such as a quartz substrate or a heat-resistant glass substrate. In the present embodiment, the transparent insulating substrates 12A and 14A are glass substrates.

In the element substrate 14, the surface of the transparent insulating substrate 14A is covered by a base protecting film (not shown) made of a silicon oxide film or the like. The thin film transistors 42 of a top gate structure are provided on the surface of the transparent insulating substrate 14A, at positions adjacent to the pixel electrodes 34. As shown in FIGS. 3A and 3B, each thin film transistor 42 includes an island-shaped semiconductor film 52A, a channel forming region 52B, a source region 52C, and a drain region 52D. Each thin film transistor 42 may further include a low concentration region having a lightly doped drain (LDD) structure on each side of the channel forming region 52B. In the present embodiment, the semiconductor film 52A is a polysilicon film formed by polycrystallizing an amorphous silicon film deposited on the element substrate 14, by laser annealing or lamp annealing.

A gate insulating film 54 made of a silicon oxide film, a silicon nitride film, or a laminated film of them is formed on the semiconductor films 52A. The gate lines 46 partially overlie the insulating film 54 and serve as the gate electrodes. In the present embodiment, the semiconductor films 52A are substantially U-shaped, and have a twin gate structure in which two gate electrodes are provided in the direction of the channel.

A first interlayer insulating film 56 made of a silicon oxide film, a silicon nitride film, or a laminated film of them is formed on the gate electrodes (gate lines 46). The data lines 44 are formed on the surface of the first interlayer insulating film 56. The data lines 44 are electrically connected to the source regions 52C most adjacent to the data lines 44, through contact holes 56A provided in the first interlayer insulating film 56. Drain electrodes 58 are formed on the surface of the first interlayer insulating film 56. The drain electrodes 58 are conductive films formed simultaneously with the data lines 44. The drain electrodes 58 are electrically connected to the drain regions 52D through contact holes 56B provided in the first interlayer insulating film 56.

A second interlayer insulating film 60 is formed on the data lines 44 and the drain electrodes 58. In the present embodiment, the second interlayer insulating film 60 is composed of a photopolymer and has a thickness of 1.5 μm to 3.0 μm. The second interlayer insulating film 60 serves as a planarizing film.

The pixel electrodes 34 made of an ITO film are provided on the surface of the second interlayer insulating film 60, in an island configuration. The pixel electrodes 34 are electrically connected to the drain electrodes 58 through contact holes 60A provided in the second interlayer insulating film 60. The drain electrodes 58 are electrically connected to the drain regions 52D through the contact holes 56B provided in the first interlayer insulating film 56 and the gate insulating film 54. The aspect ratio of the contact holes 60A is at least 0.4.

An interelectrode insulating film 62 is formed on the surfaces of the pixel electrodes 34. In the present embodiment, the interelectrode insulating film 62 is composed of a silicon oxide film or a silicon nitride film having a thickness of 400 nm or less.

The common electrodes 38 are provided on the interelectrode insulating film 62. The common electrodes 38 function as counter electrodes of the pixel electrodes 34. The common electrodes 38 face the pixel electrodes 34 with the interelectrode insulating film 62 therebetween. Thus, the capacitors 48 are formed between the pixel electrodes 34 and the common electrodes 38, in which the interelectrode insulating film 62 serves as a dielectric film. The liquid crystal layer 30 is driven by an electric field generated between the pixel electrodes 34 and the common electrodes 38, whereby an image is displayed.

Structure around Contact Hole 60A

The element substrate 14 according to the present embodiment includes, in sequence from the bottom, the transparent insulating substrate 14A, the thin film transistors 42 for switching pixels, the first and second interlayer insulating films 56 and 60 covering the thin film transistors 42, the pixel electrodes 34 electrically connected to the drain regions 52D of the thin film transistors 42 through the contact holes 60A provided in the second interlayer insulating film 60 and the drain electrodes 58, the interelectrode insulating film 62 covering the pixel electrodes 34, and the common electrodes 38 formed on the interelectrode insulating film 62.

Method for Manufacturing the Element Substrate 14

FIGS. 4A to 4E are process sectional views showing a method for manufacturing the element substrate 14 used in the liquid crystal device 10 according to the present embodiment. In the manufacturing process of the element substrate 14, the base protecting film (not shown) composed of a silicon oxide film is formed on the surface of the transparent insulating substrate 14A, which is a glass substrate. Then, the transparent insulating substrate 14A undergoes a thin film transistor forming process. More specifically, first, the semiconductor films 52A made of a polysilicon film are formed in the shape of islands, as follows. A semiconductor film composed of an amorphous silicon film having a thickness of, for example, 40 nm to 50 nm is formed over the entire surface of the transparent insulating substrate 14A, using a plasma chemical vapor deposition (CVD) method, while the temperature of the substrate is in the range from 150 degrees to 450 degrees. The silicon film is polycrystallized using a laser annealing method or the like. The polycrystallized silicon film is patterned using a photolithography technique. Thus, the semiconductor films 52A are formed.

Figure 4A:
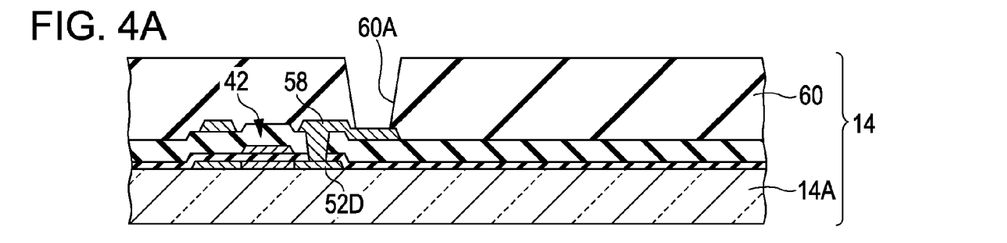
FIGS. 4A to 4E are process sectional views showing a method for manufacturing the element substrate used in the liquid crystal device according to the present embodiment.

Next, the gate insulating film 54 made of a silicon oxide film, a silicon nitride film, or a laminated film of them is formed on the semiconductor films 52A, using a CVD method or the like.

Next, a metal film such as a molybdenum film, an aluminum film, a titanium film, a tungsten film, or a tantalum film is formed over the entire surface of the transparent insulating substrate 14A. Then, the metal film is patterned to form the gate lines 46 (gate electrodes) using a photolithography technique.

Next, an impurity is introduced into the semiconductor films 52A to form the source regions 52C, the drain regions 52D, and the like.

Next, the gate insulating film 54 made of a silicon oxide film, a silicon nitride film, or a laminated film of them is formed using a CVD method or the like (a first interlayer insulating film forming process).

Next, the contact holes 56A and 56B are provided in the first interlayer insulating film 56 using a photolithography technique.

Next, a metal film such as a molybdenum film, an aluminum film, a titanium film, a tungsten film, or a tantalum film is formed over the entire surface of the transparent insulating substrate 14A. The metal film is patterned to form the data lines 44 and the drain electrodes 58 using a photolithography technique.

Next, as shown in FIG. 4A, a photopolymer is applied to the transparent insulating substrate 14A. Then, the transparent insulating substrate 14A is subjected to exposure and development. Thus, the second interlayer insulating film 60 (planarizing film) having a thickness of in the range of 1.5 μm to 3.0 μm and having the contact holes 60A is formed (a second interlayer insulating film forming process).

Figure 4B:
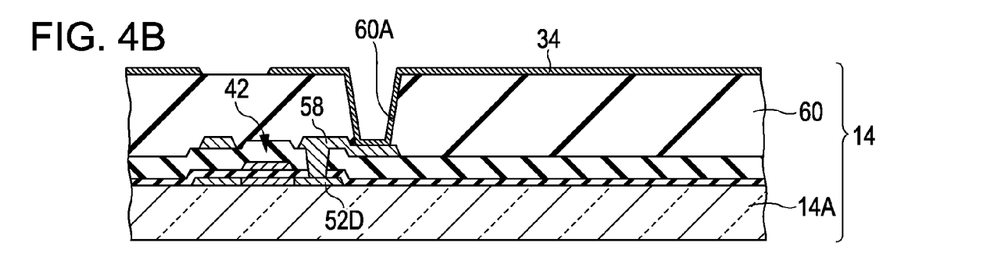

Next, as shown in FIG. 4B, a transparent conductive film made of an ITO film is formed on the entire surface of the transparent insulating substrate 14A. Using a photolithography technique, the transparent conductive film is patterned to form the pixel electrodes 34.

Figure 4C:
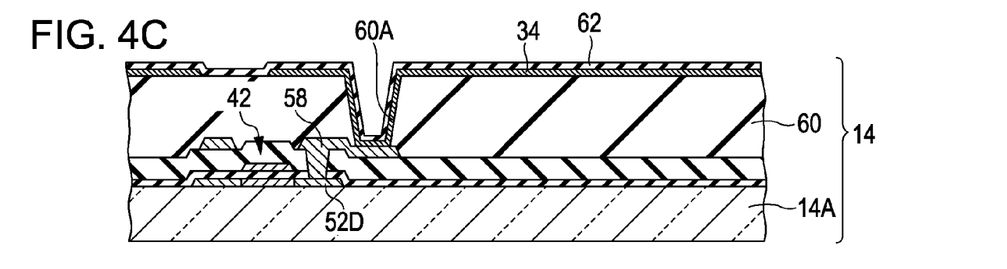

Next, as shown in FIG. 4C, using a CVD method or the like, the interelectrode insulating film 62 composed of a silicon nitride film or a silicon oxide film having a thickness of 400 nm or less is formed (an interelectrode insulating film forming process).

Figure 4D:
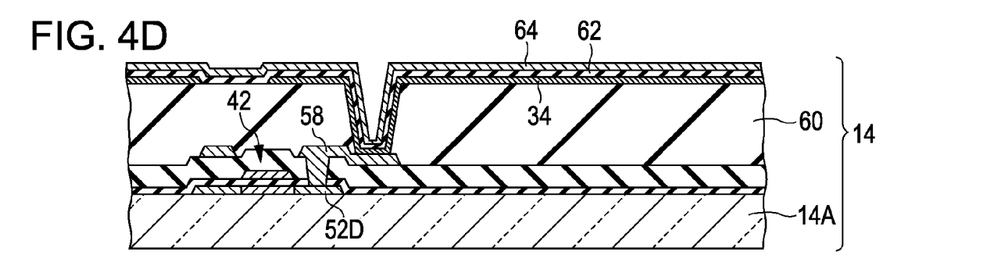
Figure 4E:
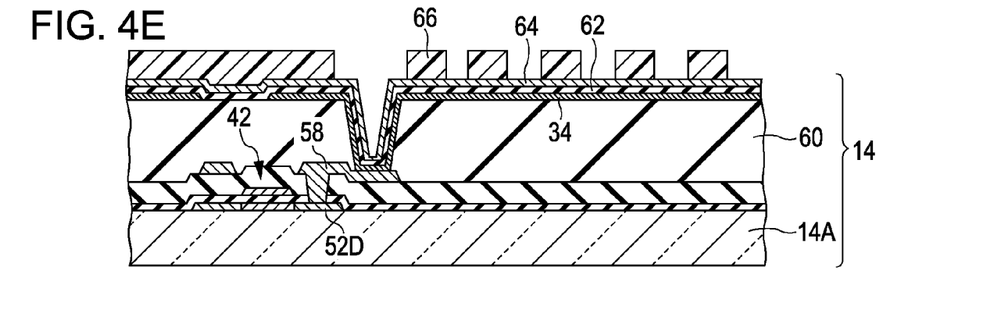

Next, as shown in FIG. 4D, the transparent conductive film 64 made of an ITO film is formed on the entire surface of the transparent insulating substrate 14A. Then, a photopolymer is applied to the transparent insulating substrate 14A. Then, the transparent insulating substrate 14A is subjected to exposure and development. Thereafter, as shown in FIG. 4E, a resist mask 66 is formed on a region where the common electrodes 38 are formed. The transparent conductive film 64 is etched through the resist mask 66. Thus, the common electrodes 38 are formed (refer to FIG. 3A).

Other Embodiments

Other embodiments of the invention are described below. The following embodiments are different from the above-described embodiment in the position of the openings 50 in the common electrodes 38. The other structures of the following embodiments are the same as the above-described embodiment. FIGS. 5 to 9 are plan views of pixels according to other embodiments.

Figure 5:
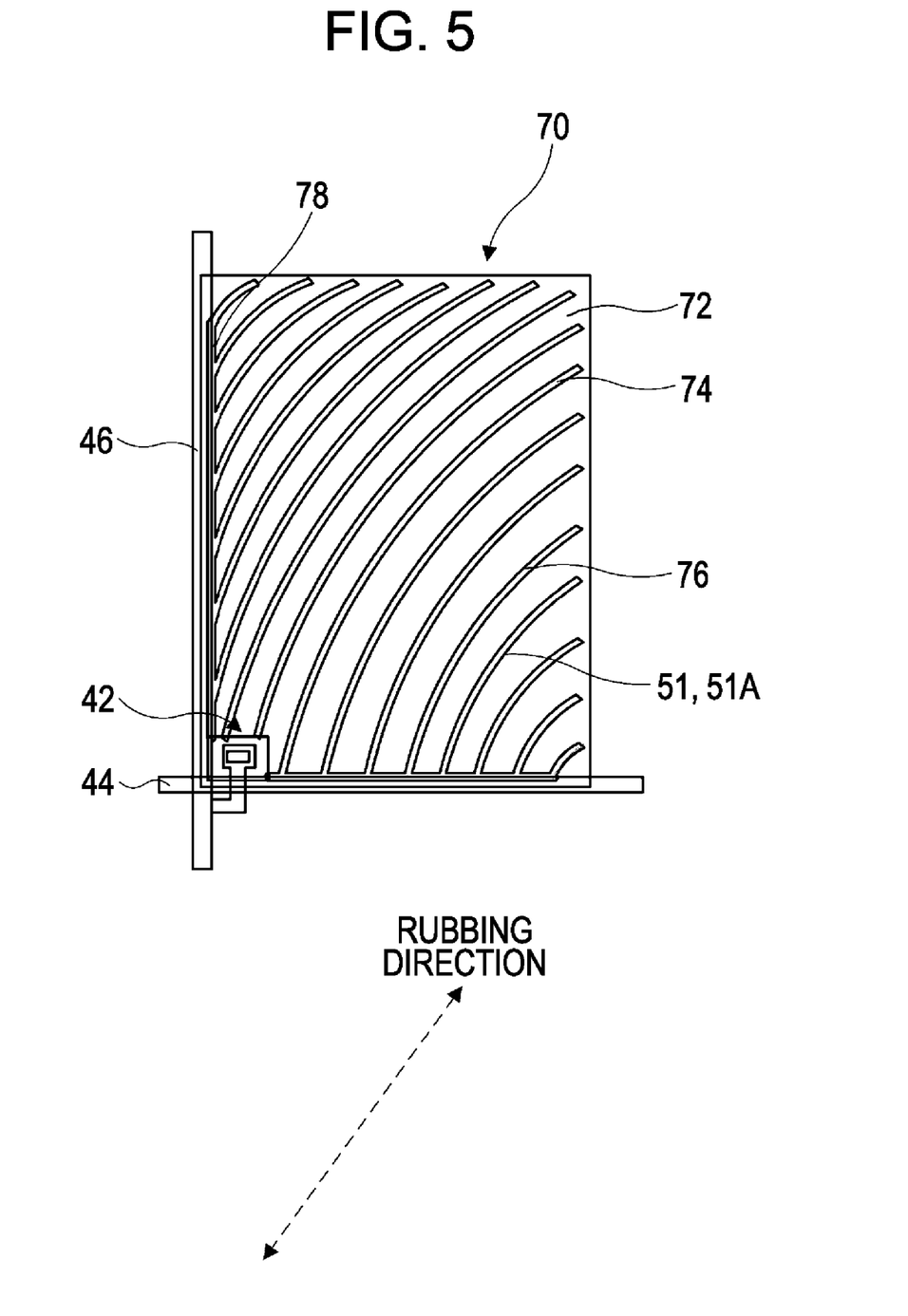
FIG. 5 is a plan view of a pixel according to another embodiment.

Referring to FIG. 5, a common electrode 72 of a pixel 70 is comb-shaped, having a plurality of circular-arc-shaped branches 74, the chords of which are parallel to the axis in the rubbing direction, a plurality of slit-like openings 76 arranged alternately with the branches 74, and a bar 78 connecting ends of the branches 74. The branches 74 of the common electrode 72 have bent portions 51. The bent portions 51 each have a curved portion 51A. The bent portions 51 are circular-arc-shaped. The chords of the circular-arc shapes of the bent portions 51 are parallel to the axis in the rubbing direction. The comb shape including the branches 74, the openings 76, and the bar 78 may be formed on the pixel electrode, instead of the common electrode 72.

Figure 6A:
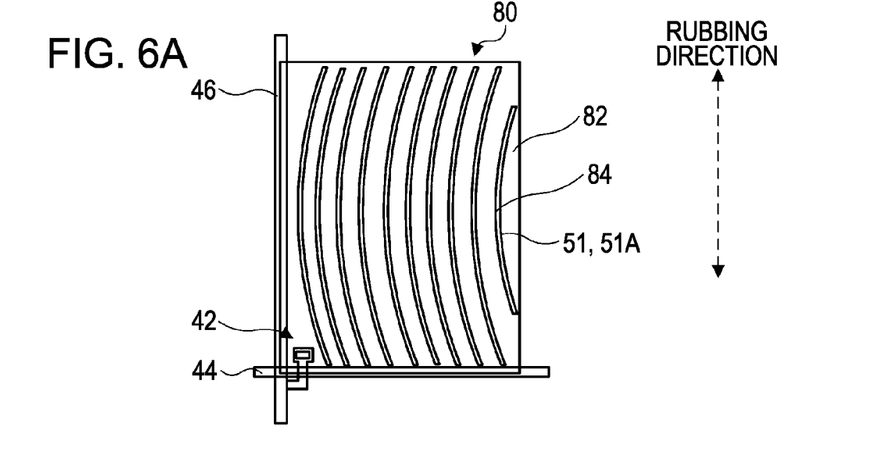
FIGS. 6A to 6C are plan views of pixels according other embodiments.

Another embodiment is shown in FIG. 6A. A common electrode 82 of a pixel 80 has a plurality of circular-arc-shaped slit-like openings 84, the chords of which are parallel to the axis in the rubbing direction (the direction in which the gate lines 46 extend). The common electrode 82 has bent portions 51. The bent portions 51 each have a curved portion 51A. The bent portions 51 are circular-arc-shaped. The chords of the circular-arc shapes of the bent portions 51 are parallel to the axis in the rubbing direction. The openings 84 may be formed in the pixel electrode, instead of the common electrode 82.

Figure 6B:
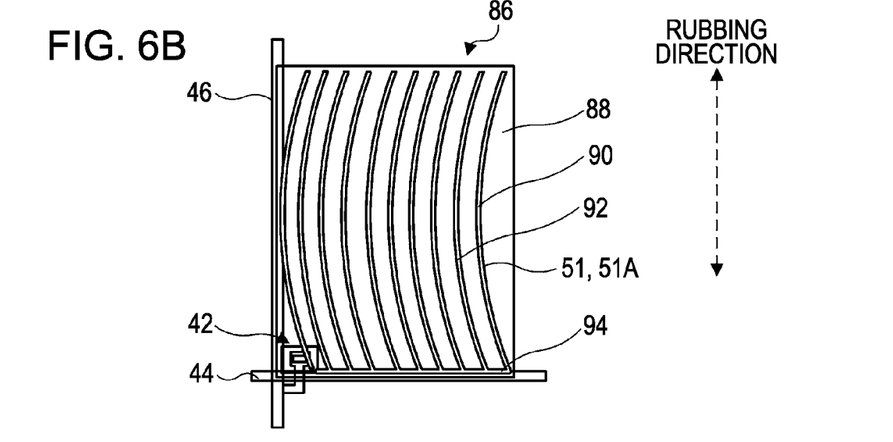
Figure 6C:
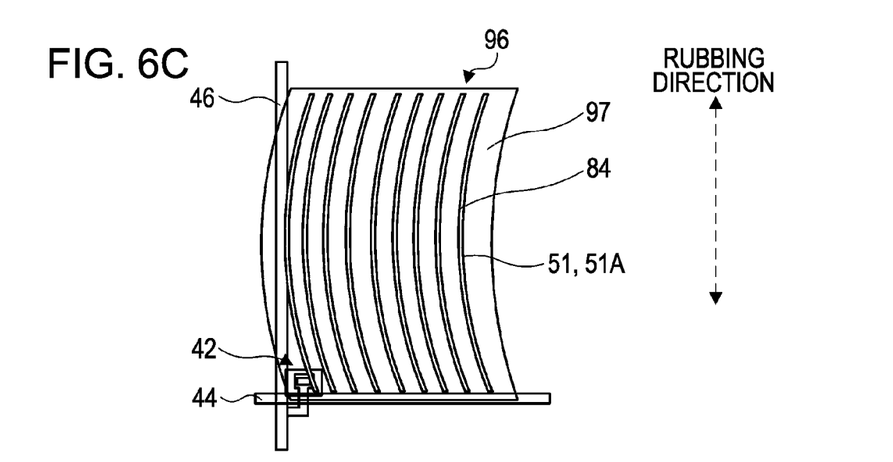

Another embodiment is shown in FIG. 6B. A common electrode 88 of a pixel 86 is comb-shaped, having a plurality of circular-arc-shaped branches 90, the chords of which are parallel to the axis in the rubbing direction (the direction in which the gate lines 46 extend), a plurality of slit-like openings 92 arranged alternately with the branches 90, and a bar 94 connecting ends of the branches 90. The branches 90 of the common electrode 88 have bent portions 51. The bent portions 51 each have a curved portion 51A. The bent portions 51 are circular-arc-shaped. The chords of the circular-arc shapes of the bent portions 51 are parallel to the axis in the rubbing direction. Alternatively, as shown in FIG. 6C, a pair of opposite sides of a pixel 96 may be circular-arc-shaped. A common electrode 97 may have a plurality of circular-arc-shaped slit-like openings 84 that are substantially congruent with the pair of opposite sides of the pixel 96. The comb shape including the branches 90, the openings 92, and the bar 94 may be formed on the pixel electrode, instead of the common electrode 88.

Figure 7A:
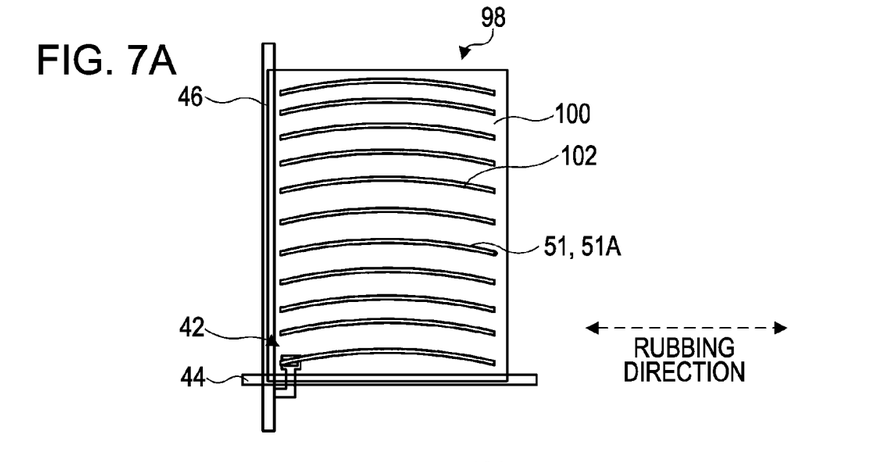
FIGS. 7A to 7C are plan views of pixels according other embodiments.

Another embodiment is shown in FIG. 7A. A common electrode 100 of a pixel 98 has a plurality of circular-arc-shaped slit-like openings 102, the chords of which are parallel to the axis in the rubbing direction (the direction in which the data lines 44 extend). The common electrode 100 has bent portions 51. The bent portions 51 each have a curved portion 51A. The bent portions 51 are circular-arc-shaped. The chords of the circular-arc shapes of the bent portions 51 are parallel to the axis in the rubbing direction. The openings 102 may be formed in the pixel electrode, instead of the common electrode 100.

Figure 7B:
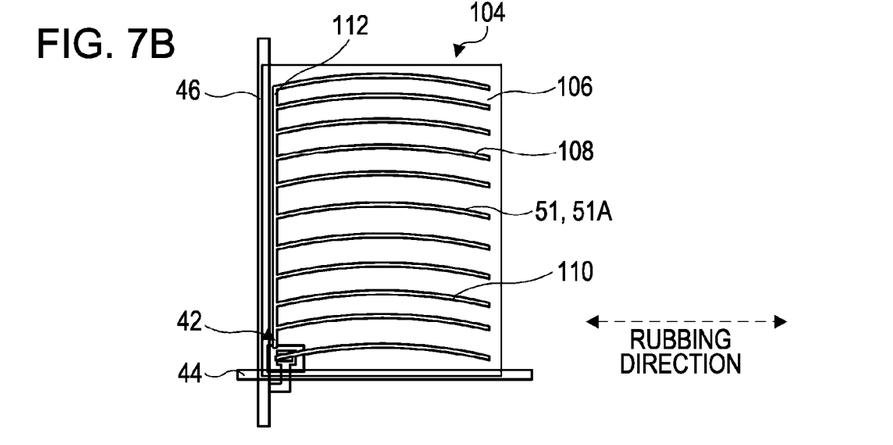
Figure 7C:
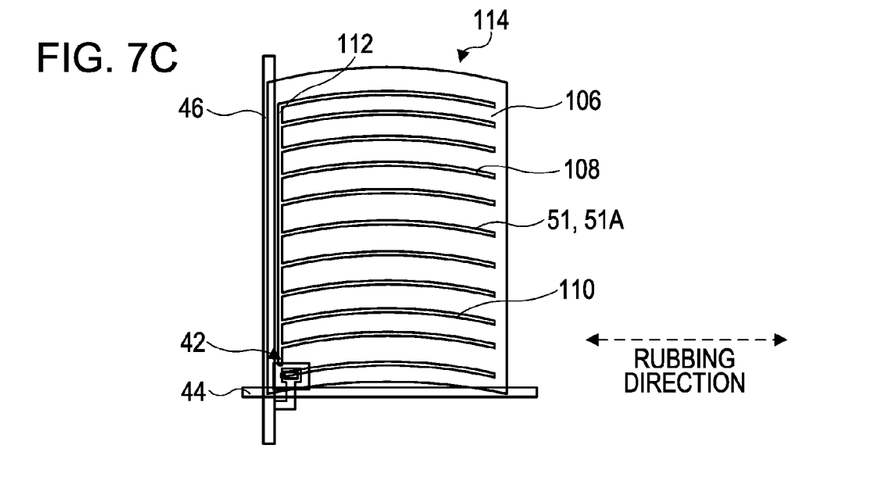

Another embodiment is shown in FIG. 7B. A common electrode 106 of a pixel 104 is comb-shaped, having a plurality of circular-arc-shaped branches 108, the chords of which are parallel to the axis in the rubbing direction (the direction in which the data lines 44 extend), a plurality of slit-like openings 110 arranged alternately with the branches 108, and a bar 112 connecting ends of the branches 108. The branches 108 of the common electrode 106 have bent portions 51. The bent portions 51 each have a curved portion 51A. The bent portions 51 are circular-arc-shaped. The chords of the circular-arc shapes of the bent portions 51 are parallel to the axis in the rubbing direction. Alternatively, as shown in FIG. 7C, a pair of opposite sides of a pixel 114 may be circular-arc-shaped. The common electrode 106 may have a plurality of circular-arc-shaped slit-like openings 110 that are substantially congruent with the pair of opposite sides of the pixel 114. The comb shape including the branches 108, the openings 110, and the bar 112 may be formed on the pixel electrode, instead of the common electrode 106.

Figure 8A:
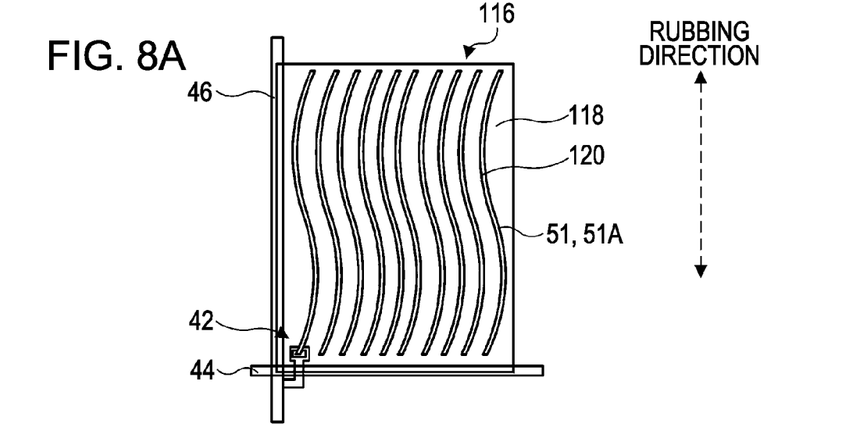
FIGS. 8A to 8C are plan views of pixels according other embodiments.

Another embodiment is shown in FIG. 8A. A common electrode 118 of a pixel 116 has a plurality of slit-like openings 120, each of which includes a plurality of circular-arc shapes. The chords of the circular-arc shapes are parallel to the axis in the rubbing direction (the direction in which the gate lines 46 extend). The common electrode 118 has bent portions 51. The bent portions 51 each have curved portions 51A. The bent portions 51 are circular-arc-shaped. The chords of the circular-arc shapes of the bent portions 51 are parallel to the axis in the rubbing direction. The openings 120 may be formed in the pixel electrode, instead of the common electrode 118.

Figure 8B:
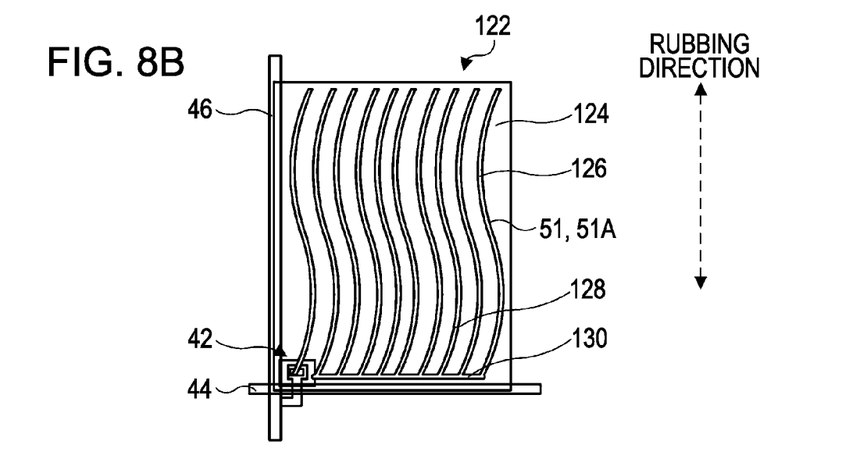
Figure 8C:
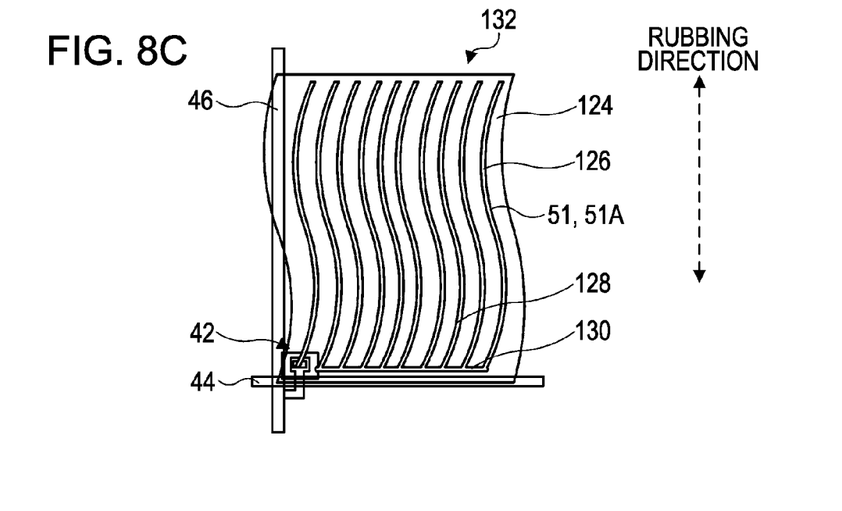

Another embodiment is shown in FIG. 8B. A common electrode 124 of a pixel 122 is comb-shaped, having a plurality of branches 126, each of which includes a plurality of circular-arc shapes, the chords of which are parallel to the axis in the rubbing direction (the direction in which the gate lines 46 extend), a plurality of slit-like openings 128 arranged alternately with the branches 126, and a bar 130 connecting ends of the branches 126. The branches 126 of the common electrode 124 have bent portions 51. The bent portions 51 each have curved portions 51A. The bent portions 51 are circular-arc-shaped. The chords of the circular-arc shapes of the bent portions 51 are parallel to the axis in the rubbing direction. Alternatively, as shown in FIG. 8C, a pair of opposite sides of a pixel 132 may be circular-arc-shaped. The common electrode 124 may have a plurality of circular-arc-shaped slit-like openings 128 that are substantially congruent with the pair of opposite sides of the pixel 132. The comb shape including the branches 126, the openings 128, and the bar 130 may be formed on the pixel electrode, instead of the common electrode 124.

Figure 9A:
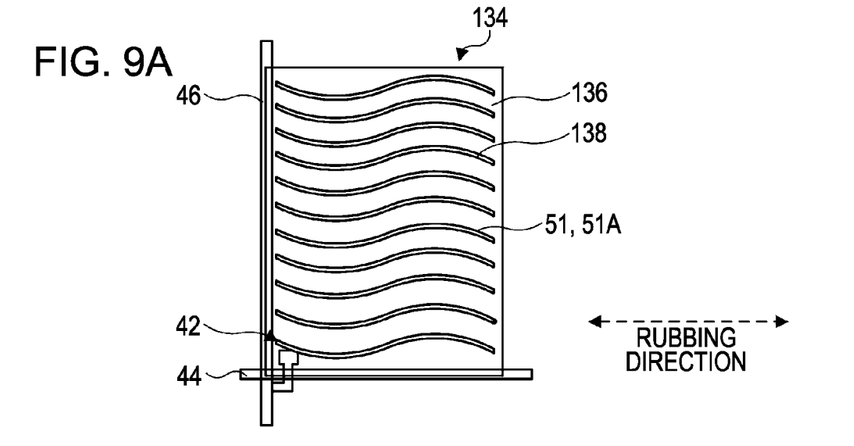
FIGS. 9A to 9C are plan views of pixels according other embodiments.

Another embodiment is shown in FIG. 9A. A common electrode 136 of a pixel 134 has a plurality of slit-like openings 138, each of which includes a plurality of circular-arc shapes. The chords of the circular-arc shapes are parallel to the axis in the rubbing direction (the direction in which the data lines 44 extend). The common electrode 136 has bent portions 51. The bent portions 51 each have curved portions 51A. The bent portions 51 are circular-arc-shaped. The chords of the circular-arc shapes of the bent portions 51 are parallel to the axis in the rubbing direction. The openings 138 may be formed in the pixel electrode, instead of the common electrode 136.

Figure 9B:
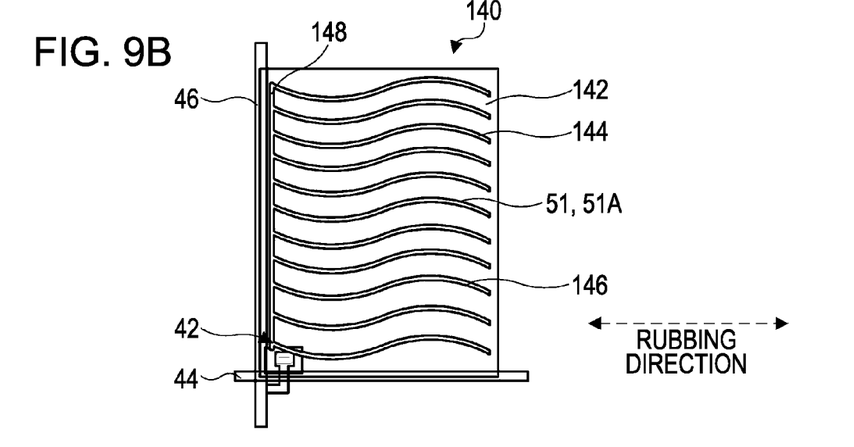
Figure 9C:
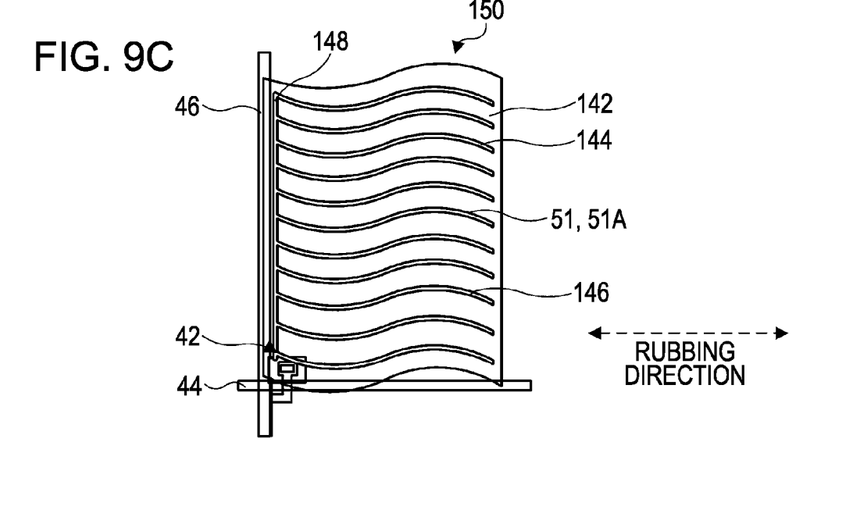

Another embodiment is shown in FIG. 9B. A common electrode 142 of a pixel 140 is comb-shaped, having a plurality of branches 144, each of which includes a plurality of circular-arc shapes, the chords of which are parallel to the axis in the rubbing direction (the direction in which the data lines 44 extend), a plurality of slit-like openings 146 arranged alternately with the branches 144, and a bar 148 connecting ends of the branches 144. The branches 144 of the common electrode 142 have bent portions 51. The bent portions 51 each have curved portions 51A. The bent portions 51 are circular-arc-shaped. The chords of the circular-arc shapes of the bent portions 51 are parallel to the axis in the rubbing direction. Alternatively, as shown in FIG. 9C, a pair of opposite sides of a pixel 150 may be circular-arc-shaped. The common electrode 142 may have a plurality of slit-like openings 146 that are substantially congruent with the pair of opposite sides of the pixel 150. The comb shape including the branches 144, the openings 146, and the bar 148 may be formed on the pixel electrode, instead of the common electrode 142.

Examples of Electronic Apparatuses Having Liquid Crystal Device

Figure 10A:
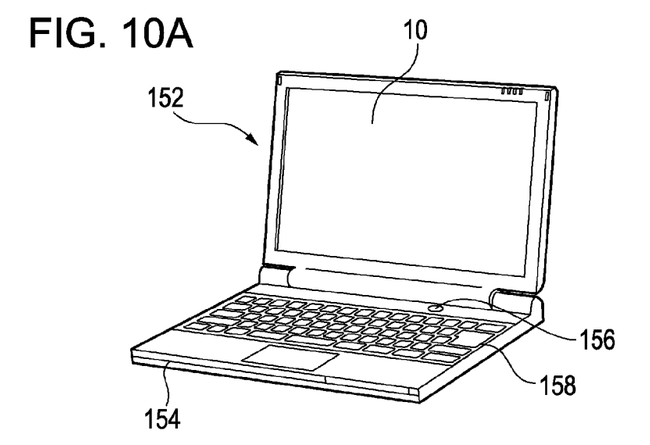
FIGS. 10A to 10C show electronic apparatuses having the liquid crystal device according to the present embodiment.
Figure 10B:
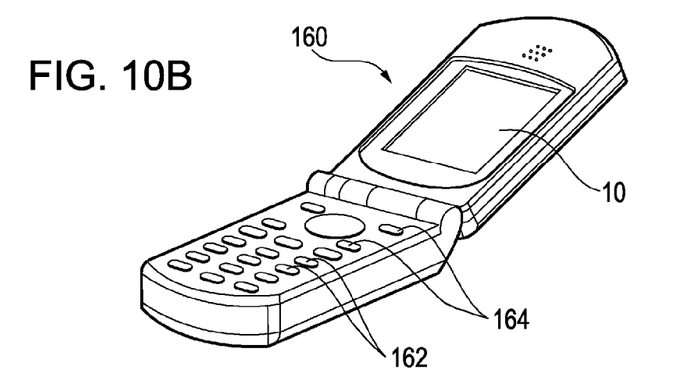
Figure 10C:
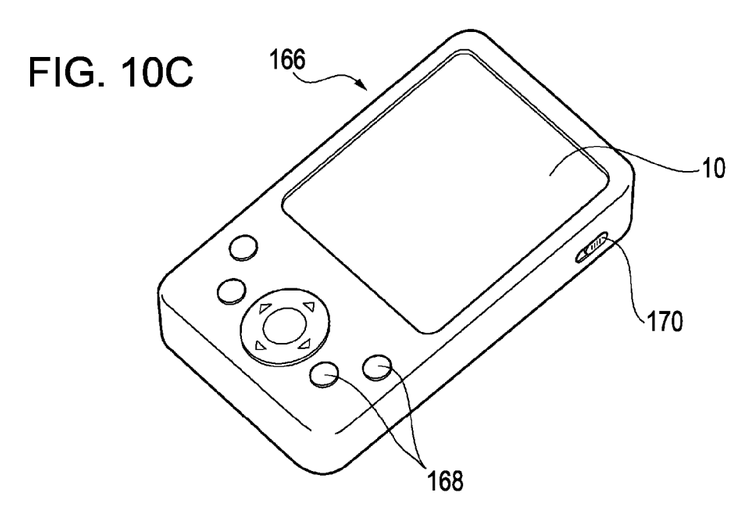

Electronic apparatuses having the liquid crystal device 10 according to any one of the above-described embodiments are described below. FIG. 10A shows a mobile personal computer having the liquid crystal device 10. A personal computer 152 has the liquid crystal device 10 and a main body 154. The main body 154 has a power switch 156 and a keyboard 158. FIG. 10B shows a portable telephone having the liquid crystal device 10. A portable telephone 160 has operation buttons 162, scroll buttons 164, and the liquid crystal device 10. An image or text displayed on the liquid crystal device 10 is scrolled by operating the scroll buttons 164. FIG. 10C shows a personal digital assistants (PDA) having the liquid crystal device 10. A PDA 166 has operation buttons 168, a power switch 170, and the liquid crystal device 10. When the power switch 170 is turned on, information such as an address list or a scheduler is displayed on the liquid crystal device 10.

Examples of electronic apparatuses to which the liquid crystal device 10 is applied to include, besides the electronic apparatuses shown in FIGS. 10A to 10C, digital still cameras, liquid crystal televisions, videotape recorders of either a viewfinder type or a direct-monitor-view type, car navigation systems, pagers, electronic organizers, calculators, word processors, workstations, videophones, POS terminals, and apparatuses having touch panels. The liquid crystal device 10 may be used as a display of these electronic apparatuses.

What is claimed is:

1. A liquid crystal device comprising:
   a first substrate;
   a second substrate arranged to face the first substrate;
   a liquid crystal layer disposed between the first substrate and the second substrate;
   a common electrode disposed over the substrate; and
   a pixel electrode overlapping the common electrode, and the pixel electrode having curved portions between slits in the pixel electrode,
   wherein the pixel electrode is comb-shaped, and
   wherein the curved portions are bent and circular-arc-shaped.

* * * * *